(12) United States Patent
Dourado

(10) Patent No.: US 9,770,080 B2
(45) Date of Patent: Sep. 26, 2017

(54) PORTABLE MOTOR-DRIVEN TRANSPORTATION MEANS

(71) Applicant: Hugo Leonardo Dourado, Salvador (BR)

(72) Inventor: Hugo Leonardo Dourado, Salvador (BR)

(*) Notice: Subject to any disclaimer, the term of this patent is extended or adjusted under 35 U.S.C. 154(b) by 0 days.

(21) Appl. No.: 14/384,584

(22) PCT Filed: Mar. 11, 2013

(86) PCT No.: PCT/BR2013/000073
§ 371 (c)(1),
(2) Date: Sep. 11, 2014

(87) PCT Pub. No.: WO2013/134838
PCT Pub. Date: Sep. 19, 2013

(65) Prior Publication Data
US 2015/0034402 A1 Feb. 5, 2015

(30) Foreign Application Priority Data

Mar. 13, 2012 (BR) ..................... BR1020120055767
Mar. 1, 2013 (BR) ..................... BR1320130050228

(51) Int. Cl.
*B62B 3/02* (2006.01)
*A45C 9/00* (2006.01)
(Continued)

(52) U.S. Cl.
CPC ................. *A45C 9/00* (2013.01); *A45F 3/04* (2013.01); *A45F 4/02* (2013.01); *B62D 1/185* (2013.01);
(Continued)

(58) Field of Classification Search
CPC .......... A45C 2009/005; B62K 2202/00; B62D 51/02; B62B 5/0026; B62B 5/0033; B62B 3/02
See application file for complete search history.

(56) References Cited

U.S. PATENT DOCUMENTS 3,316,993 A * 5/1967 Weitzner .................. A45C 5/14
180/208
5,487,441 A * 1/1996 Endo ..................... A63C 17/004
180/181

(Continued)

FOREIGN PATENT DOCUMENTS

EP 1138509 10/2001

OTHER PUBLICATIONS

Dourado, Hugo Leonardo, PCT/BR2013/000073 filed Mar. 11, 2013, "International Search Report", mailed May 3, 2013.

*Primary Examiner* — Bryan Evans
(74) *Attorney, Agent, or Firm* — McKee, Voorhees & Sease, PLC

(57) ABSTRACT

Portable motor-driven transportation means consists essentially of a personal portable motor-driven transportation means (PMT), with a telescopic handle on the upper part (2), a hand grip (25), where stowage is preferably done with a backpack (1), which offers protection and which is easily carried or slung over one's back, in a simple, practical and fast manner when arriving at one's destination or when it can no longer be used. The board is retractable and/or foldable (8), offering an additional extension (8'), proving to be extremely practical in its use. This additional space (8') can receive any object, adding a seat, or even another person. In the personal portable motor-driven transportation means (PMT), the driver and rolling wheel assemblies, such as the drive shaft (12) with a free wheel (13) and a pulled wheel (14); with a free axle (3) with free wheels (4); simple axle (Continued)

Figure 1:
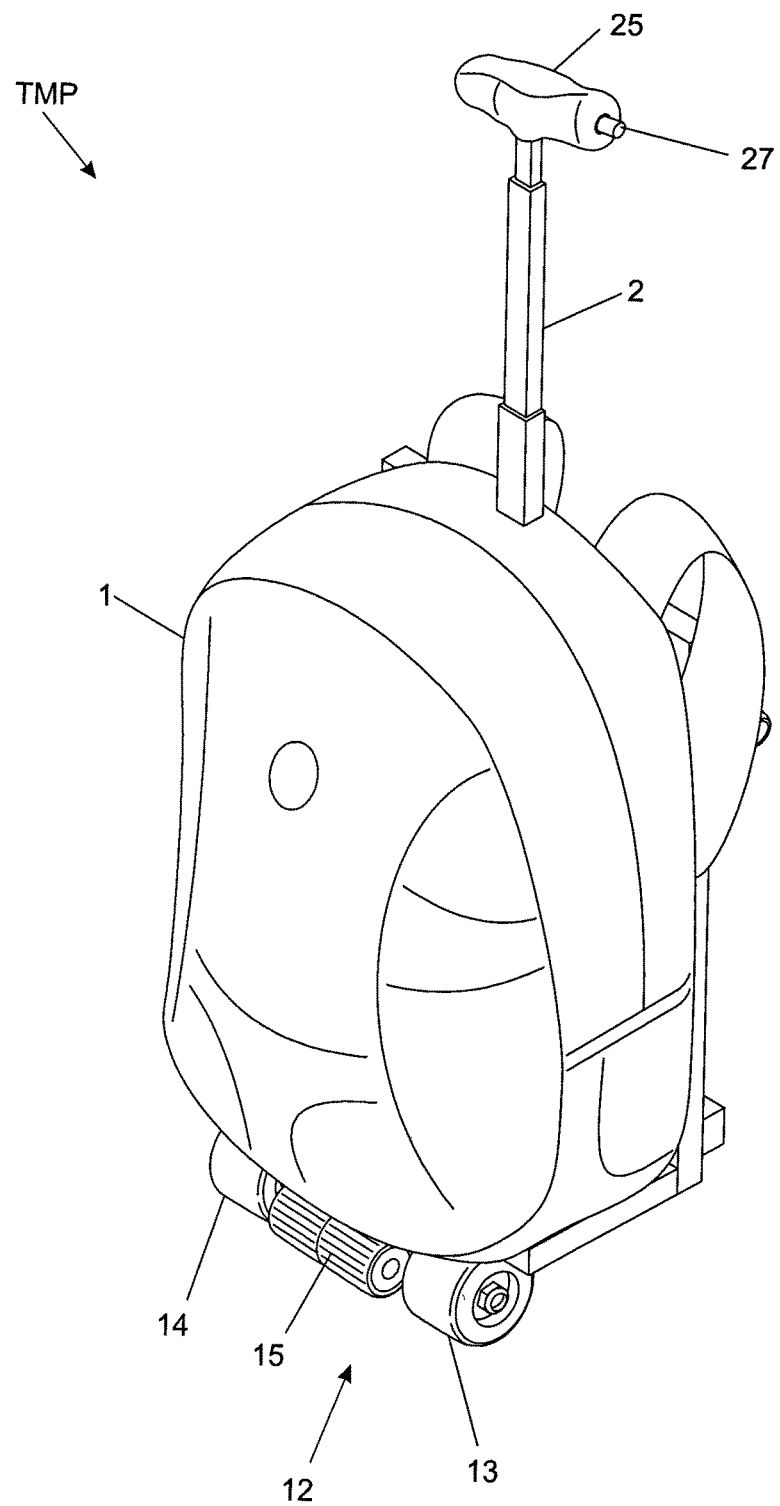

(3') with free wheel (4), considering several traction combinations, with simultaneous or partial operation, varying between 4×4, 4×2, 2×1, front or rear, with the aid of an electric motor activation system (15) in the traction, guaranteeing a multifunctional and ecologically correct personal portable motor-driven transportation means (PMT).

20 Claims, 10 Drawing Sheets

(51) Int. Cl.
     *B62D 51/02*     (2006.01)
     *A45F 4/02*     (2006.01)
     *B62D 1/185*     (2006.01)
     *A45F 3/04*     (2006.01)
     *B62M 6/60*     (2010.01)
     *B62K 3/00*     (2006.01)
     *B62K 15/00*     (2006.01)

(52) U.S. Cl.
     CPC .............. *B62D 51/02* (2013.01); *B62K 3/002* (2013.01); *B62K 15/006* (2013.01); *B62M 6/60* (2013.01); *A45C 2009/002* (2013.01); *A45C 2009/005* (2013.01); *A45F 2004/026* (2013.01)

(56) References Cited

U.S. PATENT DOCUMENTS

| | | | | |
|---|---|---|---|---|
| 5,820,146 | A * | 10/1998 | Van Ligten | B62B 5/0023 280/47.19 |
| 6,460,866 | B1 * | 10/2002 | Altschul | A45F 4/02 150/159 |
| 7,029,015 | B2 | 4/2006 | Lin | |
| 7,699,130 | B2 * | 4/2010 | Palmer | B62K 3/002 180/180 |
| 7,837,206 | B1 * | 11/2010 | Lee | A45C 5/14 280/30 |
| 8,282,109 | B1 | 10/2012 | Arjomand et al. | |
| 2002/0063007 | A1 * | 5/2002 | Dodd | B62K 3/002 180/221 |
| 2004/0056442 | A1 * | 3/2004 | Ostrowski | B62K 3/002 280/87.041 |
| 2004/0238303 | A1 | 12/2004 | Hafif | |
| 2005/0285357 | A1 | 12/2005 | Lin | |
| 2011/0155527 | A1 * | 6/2011 | Veal | A45C 5/14 190/18 A |
| 2011/0168464 | A1 * | 7/2011 | Scheuerman | B60L 11/18 180/65.51 |
| 2012/0013089 | A1 | 1/2012 | Reeves | |
| 2013/0033020 | A1 | 2/2013 | Arjomand et al. | |

* cited by examiner

PORTABLE MOTOR-DRIVEN TRANSPORTATION MEANS

CROSS-REFERENCE TO RELATED APPLICATIONS

This is a National Phase application claiming priority to PCT/BR2013/000073 filed Mar. 11, 2013 which claims priority to BR 10 2012 005576 7 filed Mar. 13, 2012 and BR 13 2013 005022 8 filed Mar. 1, 2013, all of which are herein incorporated by reference in their entireties.

This application for a Patent of Invention for an original portable motor-driven transportation means, essentially consists of a means of portable motorized complementary personal transportation, that is, which does not require physical effort by the user, and which also carries the transported party's hand baggage without the user needing to support its weight, and which is portable and easy to carry, in a discreet manner, when not in use, and which stands out for being an auxiliary means of daily transportation and having a compact and easy to handle stowage, with a significant advantage due to its multi-functionality, economy and harmlessness to the environment.

The field of application is that of movement and individual motorized transport in general, where there is the need to carry it and use it as a daily, auxiliary means of transport.

Technicians in the subject are well aware of individual means of transportation such as skateboards, roller skates, bicycles, walk machines, electric scooters, among others; however, they all present certain limitations.

The skateboard, even the electric model, is not practical in terms of being carried when it is not in use. Besides carrying a backpack, handbag or bag, the person also needs to worry about carrying the skateboard when it is not possible to use it.

Another design improvement over the electric skateboard was the electric scooter, with the possibility of a telescopic handle as equilibrium support for the person being transported. No doubt, having support where you can hold on provides greater equilibrium and safety for the transported party, making it possible for even those without much ability to use it. The disadvantages are the excessive weight and the difficulty to transport it when not in use.

Walk machines are geared towards leisure and sports in gym equipment simulating a mechanism for the user to take walks; however, they are static and do not serve the purpose of transportation.

On the other hand, electric bikes are well known and broadly used in the market. They resemble bicycles, have good load capacity; however, when not used, they are extremely awkward and heavy for transportation, requiring another means of transportation for movement.

Electric scooters are also known, structurally designed as tricycles, with motorization mounted on the triangular floor between the user's feet. However, due to their size and weight, they do not offer disassembly and stowage, for example, in a bag, making transport by the user, when not in use, unfeasible.

Another important factor in the market and which is known, involves "handbags, suitcases and backpacks" with wheels, but which do not propose, in an integrated manner, the transportation of the user, as proposes in this project, presenting a few inconveniences, such as weight when walking. For example, it is known that it is quite tiresome to cross an airport pulling a bag even it has the best little wheels.

In summary, the aforementioned equipment has inconveniences, which include:

Inappropriate for stowage and individual transport when not in use;
Generally have one drive wheel, inhibiting use on irregular surfaces and their capacity to overcome obstacles is compromised;
Although they have an advantageous structure, load capacity is limited;
Such definitions, however, become very limited when compared to the broad spectrum of use of means of transportation.

The current state of the technique anticipates some patent documents that explain the matter in question such as PI9406090-8—"MEANS OF TRANSPORTATION AND VEHICLE ON WHEELS"—which is a means of transportation on wheels for use in leisure or sports activities having one drivable front wheel (7) and two back wheels (11). A user of the vehicle stands on the spaced platforms (10, 12) mounted respectively near the front wheel (7) and near the rear wheels (11). The front platform (12) is connected by cables (15) with the fork (6) of the front wheel (7) carrier vehicle and it is pivotally mounted on the chassis (20) in a way that activation by the user's foot operates it through the cables (15) to drive the front wheel (7). Due to the pivoting platform (12), besides steering the vehicle, it permits the user to make additional body movements while riding over the ground similar to those experienced when surfing (in the sea) compared to the usual skate board.

In the document shown above, one realizes that the concept is an elaboration of a skateboard, equipping it with greater maneuverability, although limited to this objective.

Another document is the MU7201076-2—"MOTORIZED SKATEBOARD", comprised of a platform (1), with an anti-slip surface, where trucks (2) and (3) are affixed to the bottom face, both comprised of shock absorbing blocks (4), for supports (5) and (6) front (7) and rear axles (8), with their respective wheels (9), but most specifically to a small vehicle especially developed plus the characteristics of a traditional skateboard with those of a small combustion motor, thus providing the vehicle with its own drive force.

In this document, observe that the motorization is, without any doubt, a differential that provides greater comfort and more locomotion speed; however, it is polluting because it uses a combustion motor, and it is thus outside the purpose of the patent claimed herein.

The MU 8601126-0 document, "CONFIGURATION OF A PATENT APPLIED A BAG WITH A STEERING WHEEL AND ROLLERS", which integrates a specially built scooter attached to a bag or backpack, facilitating its transportation and conducting, compact and functional, and also becoming a carrier of additional suitcases or backpacks by lifting the transversal support boards arranged on the scooter's support base.

The document above points to a solution that although its objective to provide personal transportation together with the carrying of hand baggage is similar to the one presented herein, the equipment is not equipped with motorization, an indispensable element for reduced physical effort on the part of the user.

In short, the current state of the technique presents the following main limitations:
Devices geared towards the leisure segment, without a transportation mobility purpose;
When equipped with motorization, they are driven by combustion motors, an unfit condition for the environment;

With these construction characteristics and large sizes, they are unfit for the portable transportation issue;

They are not transportation solutions but rather mechanisms adapted for specific situations of use;

The cost/benefit ratio is disadvantageous.

With the purpose of solving and eliminating the aforementioned problems, the inventor, a professional tied to the sector in question, idealized the patent of invention herein of the portable motor-driven transportation means which in general lines can be defined as a means of motorized and portable, where the stowage is preferably done in a backpack, however, not limited to this form, which offers protection and can be easily carried or slung over one's back, in a simple, practical and fast manner, upon arriving at one's destination, or when it can no longer be used, providing an effective means of transportation, low, periodic maintenance and excellent cast/benefit ratio.

The portable motor-driven transportation means can be used for leisure, especially when traveling, getting to know new places, taking long walks while carrying a backpack, bag or bag; professionally, by executives or professionals who necessarily move about as part of work, using some sort of baggage, like mail carriers; or as an auxiliary means of daily transport, facilitating displacement from home, from work or other place to the stop or station for the means of public transport that will take the person to the final destination, serving as an excellent option for young students.

In portable motor-driven transportation means, observe that it encompasses a diversity of applications, including the capacity to use it in places that are difficult to access, irregular terrain, military applications, police work, sports, surgical centers, hospitals as well as medical or police emergencies, complementing transportation by helicopter, a toy for children, etc.

In portable motor-driven transportation means, the board is retractable and/or foldable, offering an additional extension, preferably in the rear; however, it may be added to the front, proving to be extremely practical in its use. This additional space can receive any object, adding a seat, or even another person.

In portable motor-driven transportation means, the transformation of the towed backup mode to the transport mode showing the mechanical movement of the retractable/foldable board, and in this mode, the inventions can be used as a vehicle for transportation, with the user getting on the retractable/foldable board.

In portable motor-driven transportation means, the versatility of the equipment and of the board enables it to be folded along the side of the backpack and/or on its sides, permitting a bigger board and with the backpack positioned between the user's legs.

In portable motor-driven transportation means, a handle grip was added to the upper part of the telescopic handle, which serves as support for the hands and which functions as handle bars, increasing the transport's driveability. This handle is provided as a single piece up to a quadruple piece, and in the latter case, receiving an extension between them, in accordance with user needs.

In portable motor-driven transportation means, with the introduction of the hand grip, it was possible to add an equipment activation control button, as an alternative to remote control.

In portable motor-driven transportation means, motorization is a differential that provides much more comfort as well as greater locomotion speed, while also being a non-polluting option since it does not use combustion. The motor uses easily rechargeable batteries that use any electric outlet.

In portable motor-driven transportation means, the retractable/foldable board, when in the horizontal position, serves as a base to support the person who, with feet on the same board, can steer the movements, controlling direction.

In portable motor-driven transportation means, more specifically at the base of the retractable/foldable board, when in the horizontal position (transport mode), there is the drive shaft with a free wheel and a wheel pulled by a belt or a chain.

In portable motor-driven transportation means, the aforementioned belt or chain is attached to an electric motor, controlled by a receiver board and fed, for example by two, preferably 12 V batteries.

In portable motor-driven transportation means, the acceleration and braking system is operated by commands given by remote control, while steering is controlled by inclining one's body on the base of the retractable/foldable board.

In portable motor-driven transportation means, the use is multifunctional, since it can be used in other specific activities by simply adjusting the drive assembly and arranging the wheels.

In portable motor-driven transportation means, because the support board is retractable and/or foldable it permits a significant improvement in accommodating the user, and it also facilitates carrying another companion.

In portable motor-driven transportation means, the flexibility in the controls with strategically positioned activation in accordance with user and/or model needs.

In portable motor-driven transportation means, all the activation of controls and devices, as well as the data obtained on speed, battery charge level, route, GPS, time, etc., can be informed using wireless technology in contact transmission, increasing the receiver board for these additional processing and logic functions.

In portable motor-driven transportation means, the driver assemblies and the electric traction activation systems consider versions with total traction, that is, front and rear traction with simultaneous or partial operation, complemented with the adoption of combinations between traction and pulled wheels, able to vary from 4×4, 4×2, 2×1 front or rear, permitting multifunctional PORTABLE MOTOR-DRIVEN TRANSPORTATION MEANS, in accordance with user or model needs.

In portable motor-driven transportation means, an activation control using a pedal and/or pressure on the equipment, however located on the retractable and foldable board, facilitates utilization by the user in accordance with the need. Observe that utilization can be concomitant with the control button present on the hand grip, described above, without jeopardizing functions.

In portable motor-driven transportation means, it is easy to change the equipment's direction, going forward or backward, that is, the transport can go in any direction.

Therefore, basically, this motorized transport in its construction details is comprised of a structural frame and of guide pins that serve to slide the retractable and/or foldable board, of the locking mechanisms for the same, of the mechanism for attaching the telescopic handle, of the sets of batteries and of the respective positioning, of the acceleration and braking systems, of the activations by belt or chain of the transmission system, of the receiver board, of the remote control, of the stowage compartment, since all of these elements comprise the basis for this document of a patent of invention.

In short, the invention deposited herein has the following major advantages:

It is extremely multifunctional, since it can be used in other specific activities by simply adjusting the drive assembly and arranging the wheels;

Because the support board is retractable and/or foldable, thus it permits a significant improvement in accommodating the user, and it also facilitates carrying another companion;

Flexibility in the controls with strategically positioned activation in accordance with user and/or model needs;

Facility in controlling steering in a practical, fast and versatile way;

Functionality and practicality—extrapolates the basic objective of conventional transport equipment, enabling an unprecedented means to do so;

Reduced manufacturing cost—simple construction and availability of materials in the market.

Figure 2:
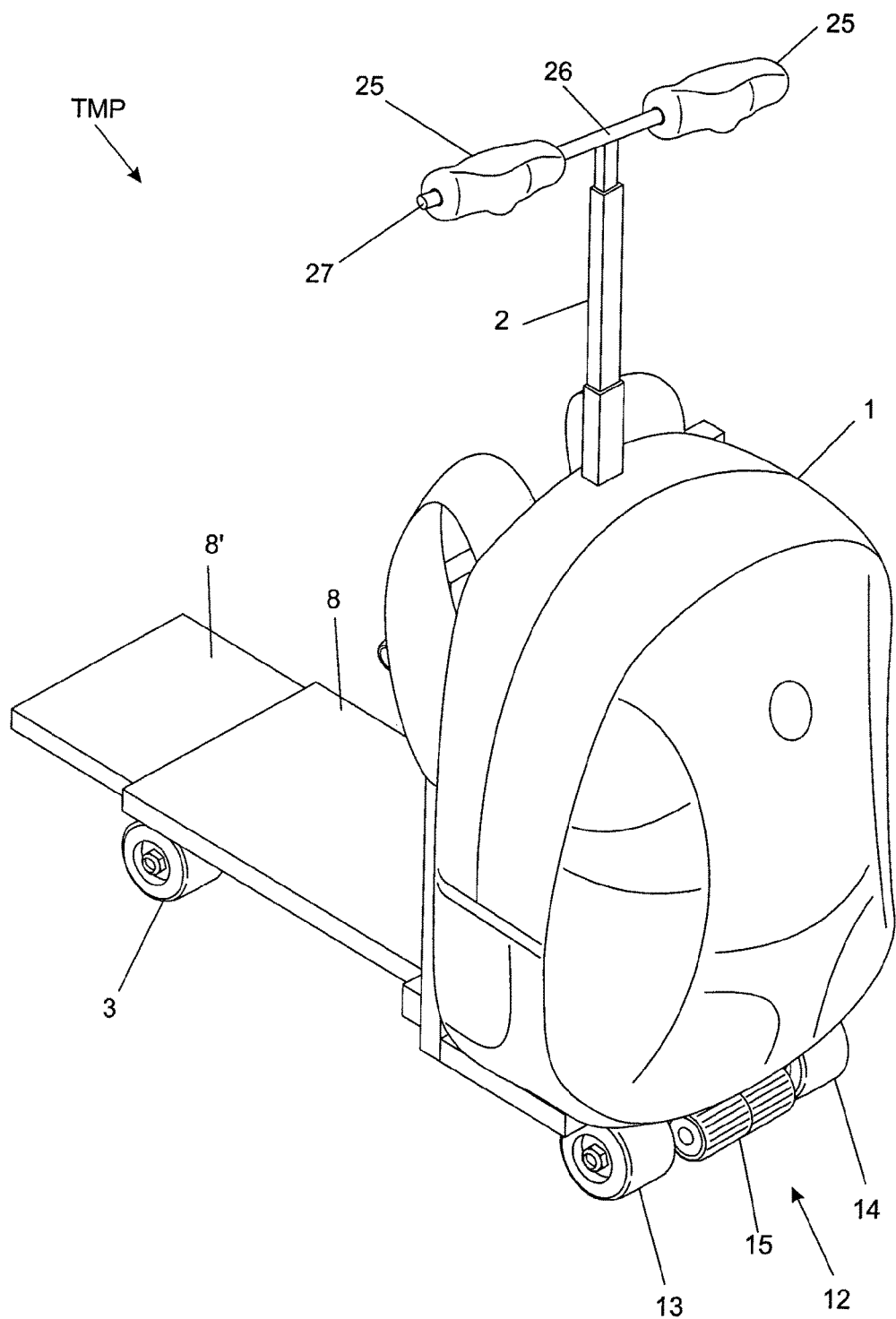
Figure 3:
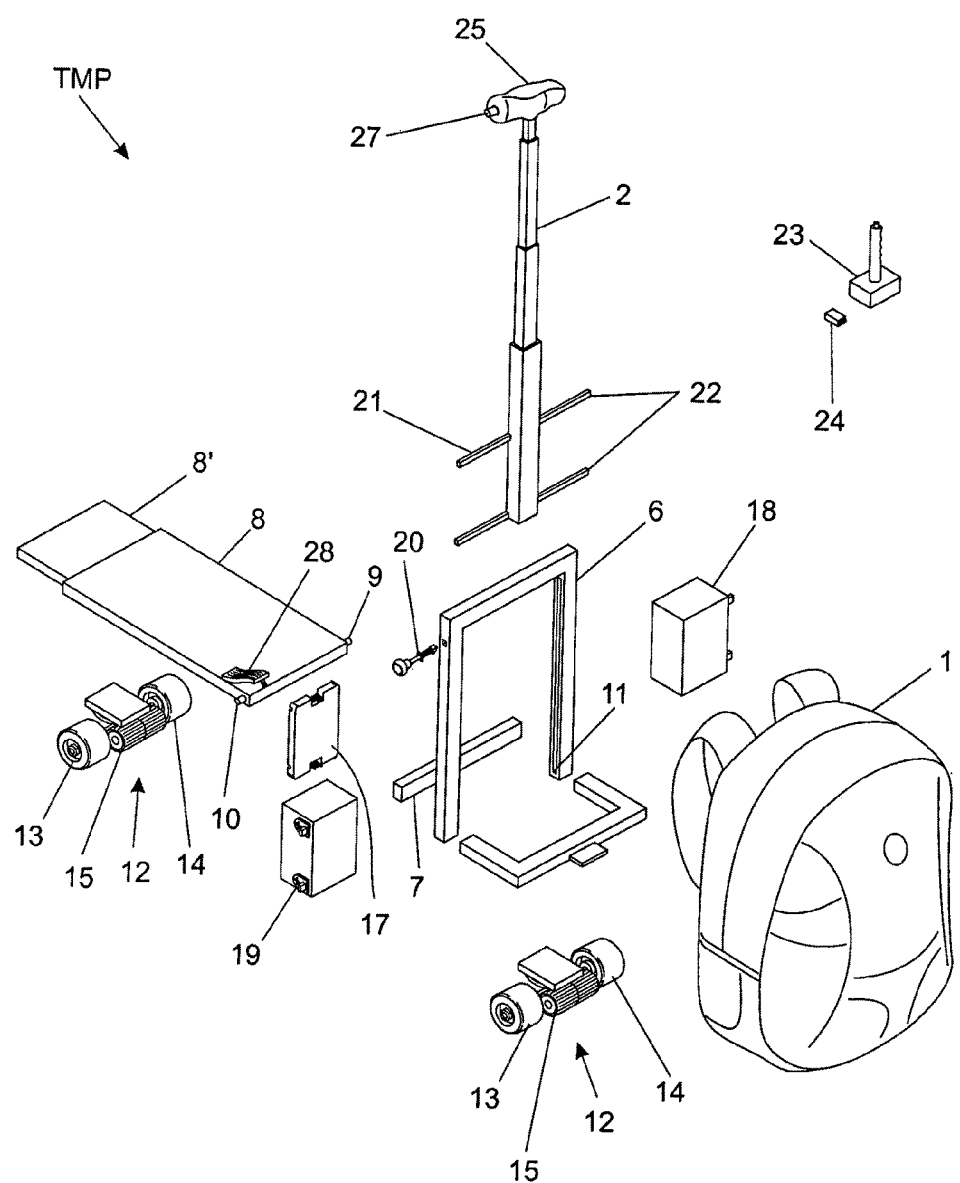
Figure 4:
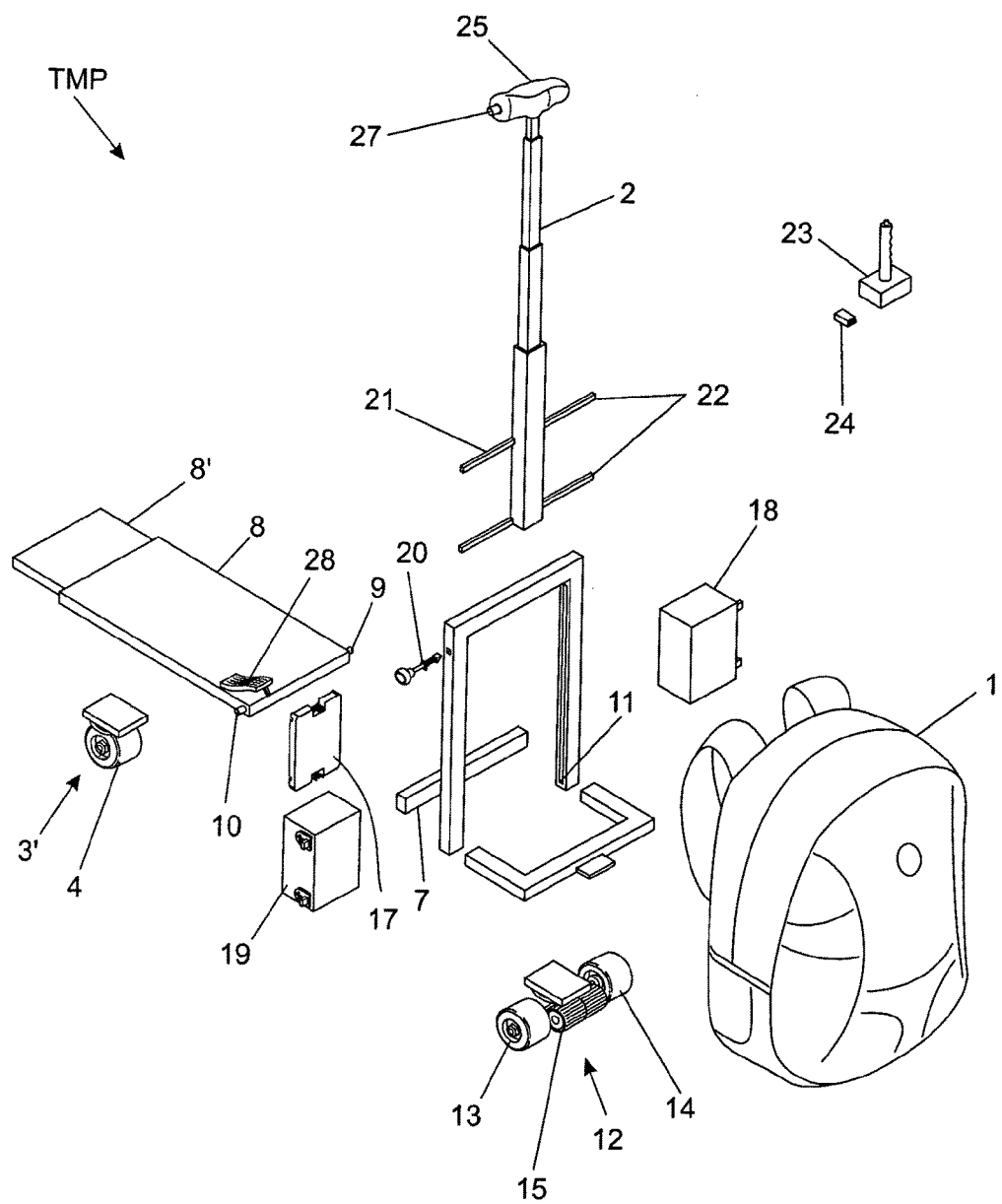
Figure 5:
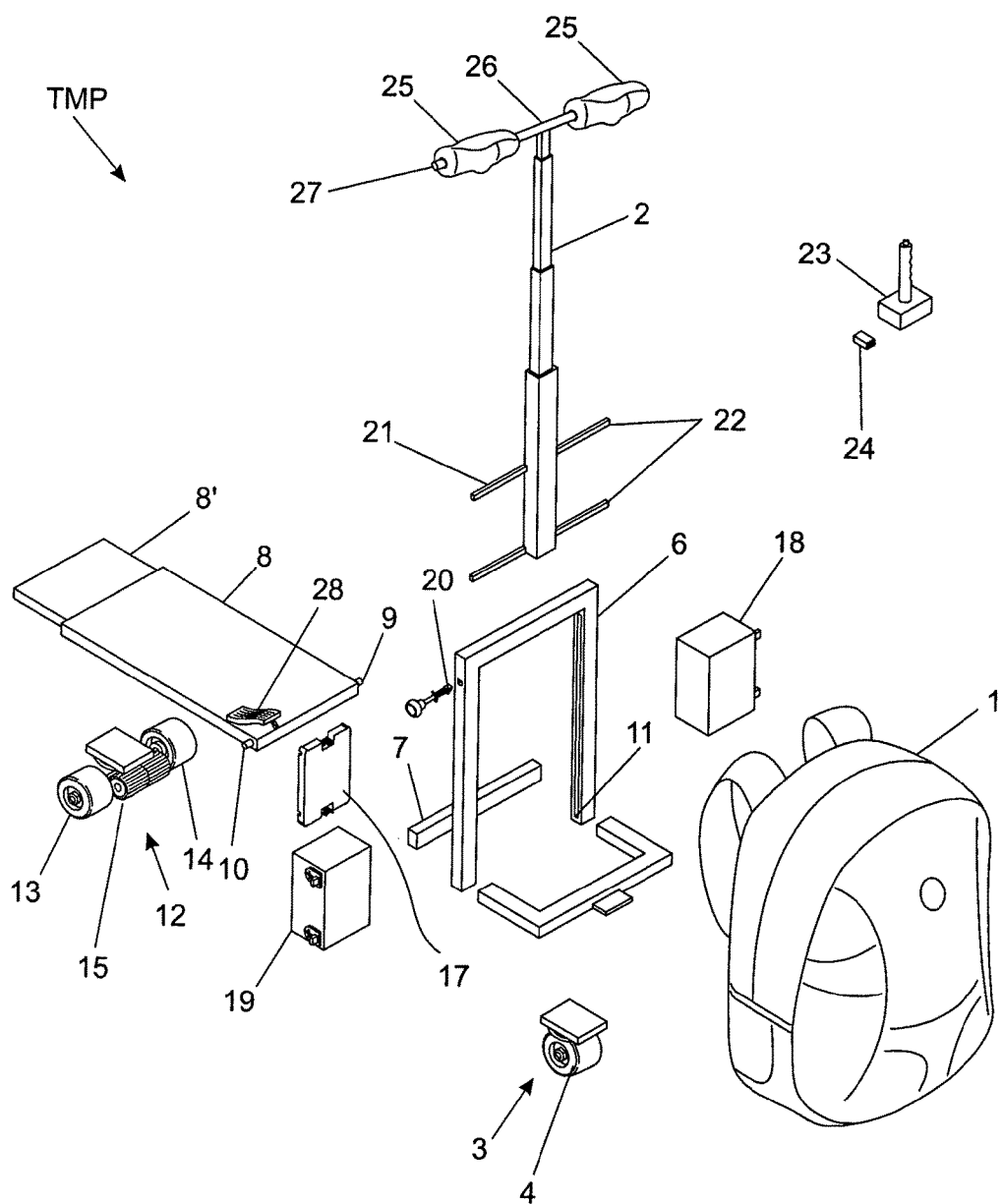
Figure 6:
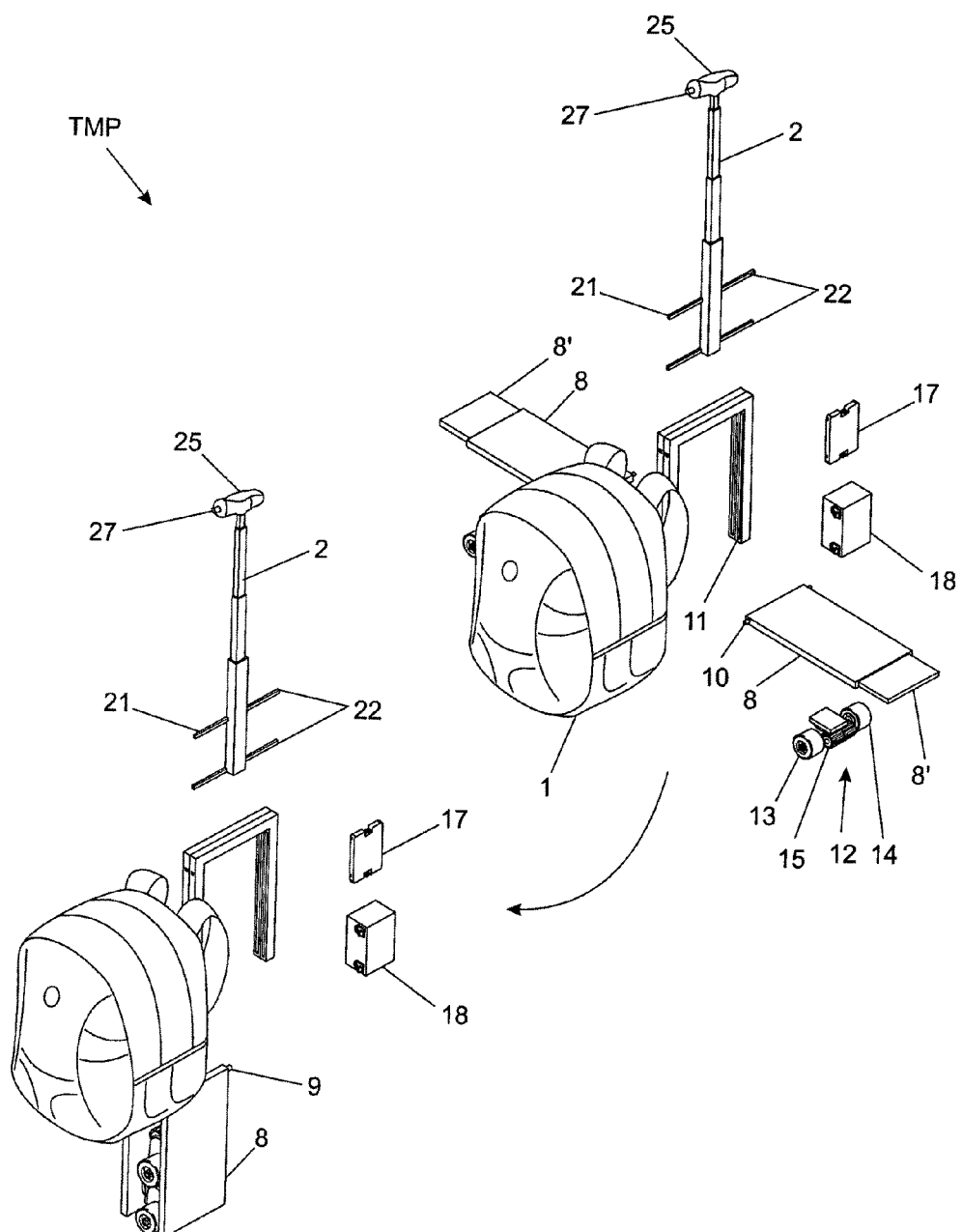
Figure 7:
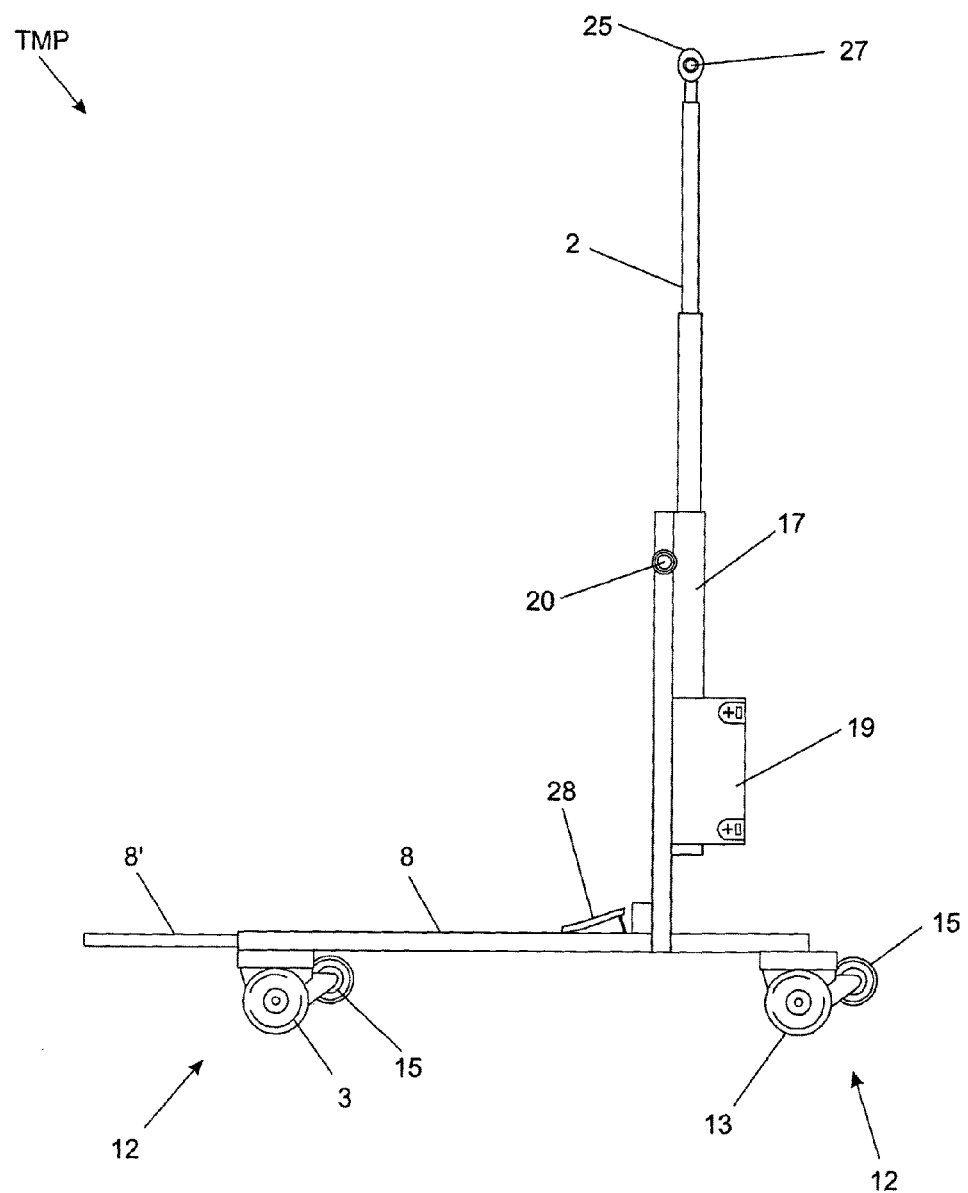
Figure 8:
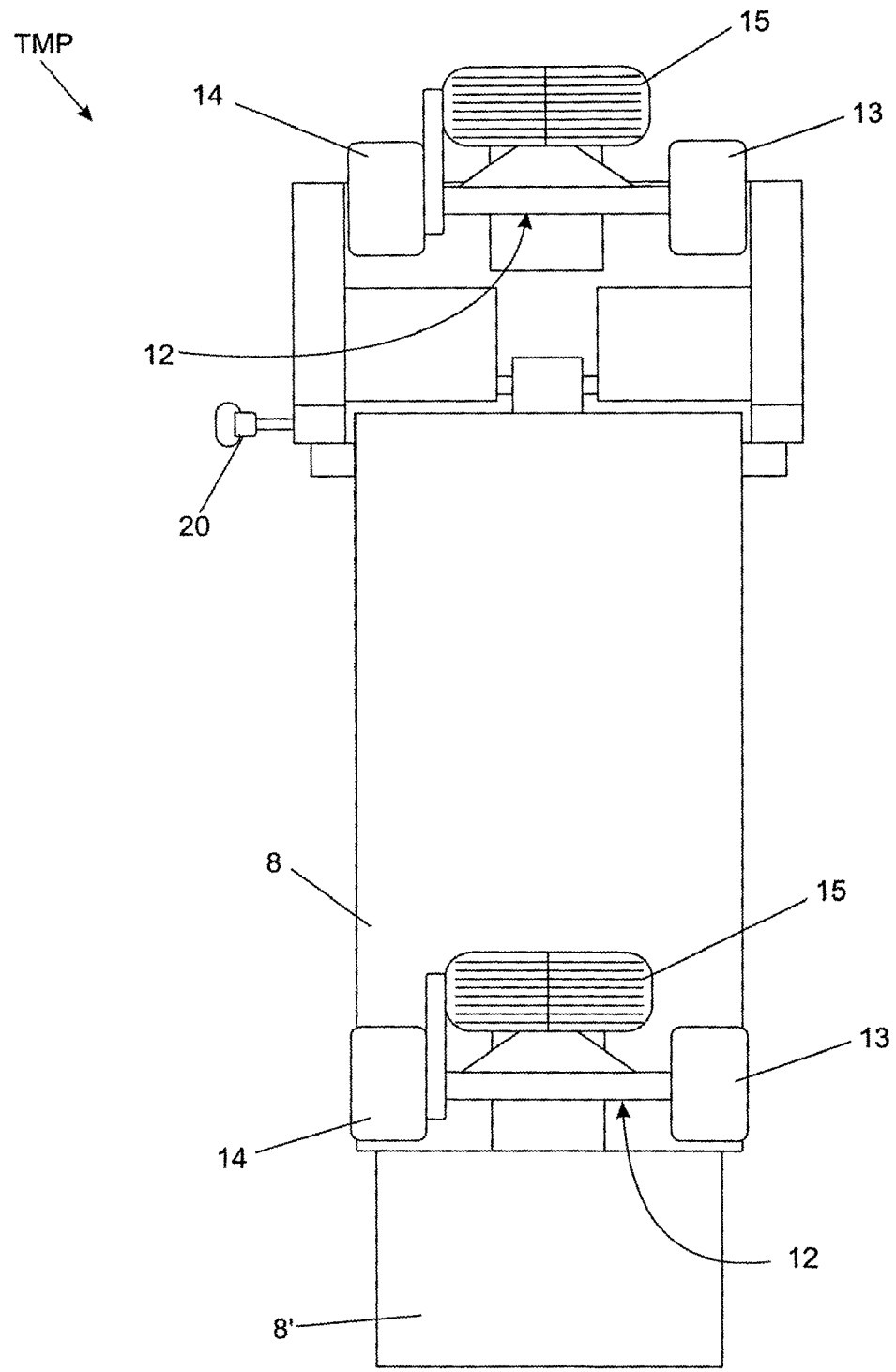
Figure 9:
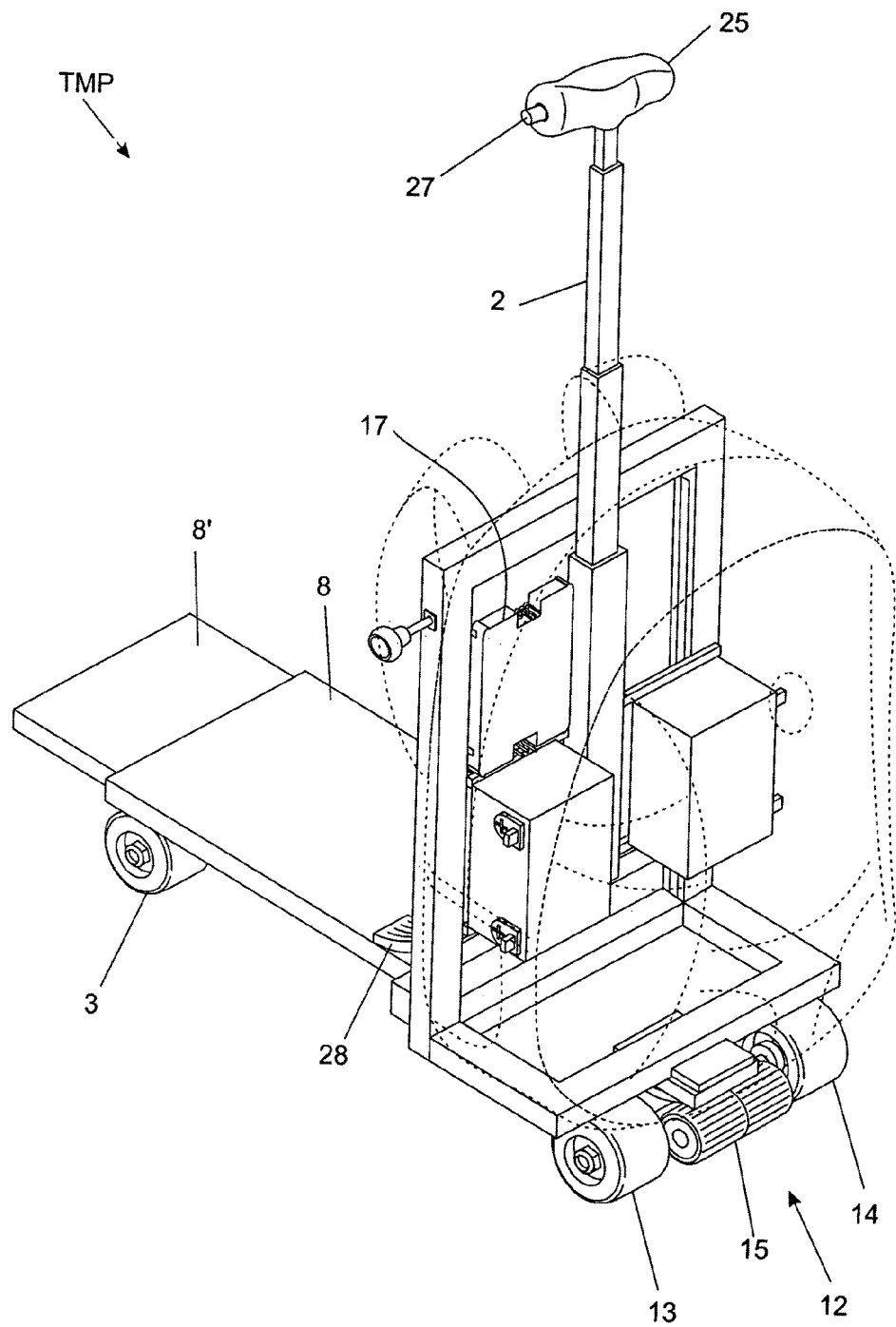
Figure 10:
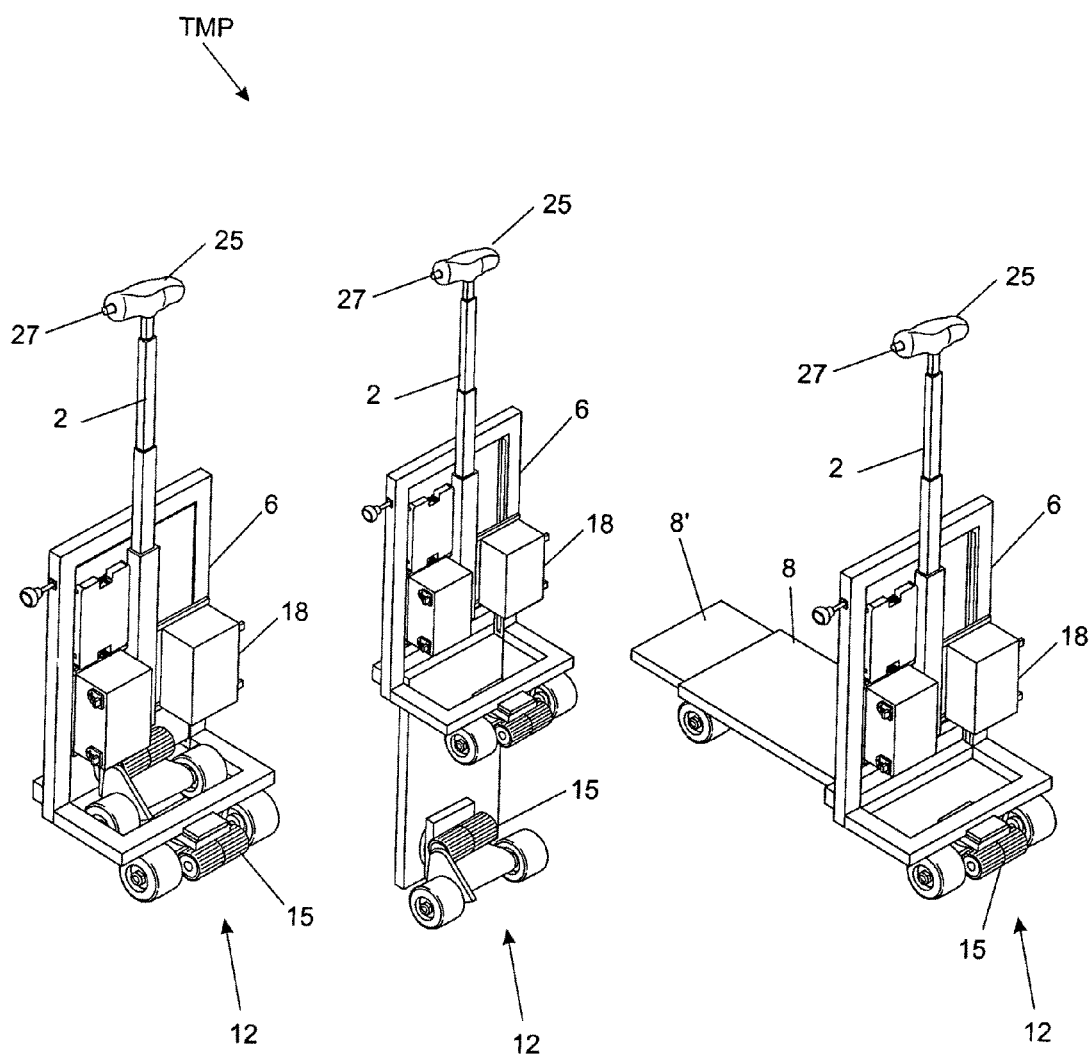

Below, the functional, aesthetic and structural particularities of the invention are explained, with reference to the attached drawings, in which they are represented in an illustrative but not limited manner:

FIG. 1: Perspective view of the portable motor-driven transportation means, stowed in the stowage compartment, highlighting the telescopic handle and the hand grip;

FIG. 2: Perspective view of the portable motor-driven transportation means, with the telescopic handle and hand grip, ready for use, highlighting the retractable/foldable board with the extender;

FIG. 3: Exploded perspective view of the portable motor-driven transportation means, showing preferential execution;

FIG. 4: Exploded perspective view of the portable motor-driven transportation means, showing a first construction variation of the rolling wheel assembly;

FIG. 5: Exploded perspective view of the portable motor-driven transportation means, showing a second construction variation of the rolling wheel assembly;

FIG. 6: Exploded perspective view of the portable motor-driven transportation means, showing a third construction variation of the positioning of the backpack at the center of the retractable/foldable board;

FIG. 7: Cross-sectional perspective view of the portable motor-driven transportation means, showing preferential execution;

FIG. 8: Lower schematic perspective of the portable motor-driven transportation means, showing the preferential execution of the rolling wheel assembly and the retractable/foldable board;

FIG. 9: Perspective view without the stowage compartment, in preferential execution, showing the main components of the portable motor-driven transportation means;

FIG. 10: Sequential perspective view of the portable motor-driven transportation means, in preferential execution, preparing it for use.

For better clarity and elucidation of this patent of invention, corroborated with the figures above, details of the patent are presented.

The portable motor-driven transportation means, object of this application for a Patent of Invention, essentially consists of a personal portable motor-driven transportation means, (PMT), equipped with a backpack, handbag or bag (1), containing a telescopic handle on the upper part (2), on the lower part, a free axle (3) with free wheels (4); simple axle (3') with free wheel (4), on the upper part of the front axle assembly with the wheels, there is a horizontal frame (5), with a 90° vertical frame welded to it (6), a lock (7) for the retractable/foldable board (8), with the guide pins (9) and (10) and an internal duct (11) on the sides. On the base of the retractable/foldable board (8), considering it in the horizontal position (transport mode), there is the drive shaft (12) with a free wheel (13) and a pulled wheel (14) by a belt of a chain (16), attached to an electric motor (15), controlled by a receiver board (17) and fed, for example, by two batteries (18) and (19) preferably 12 V.

More specifically, in the portable motor-driven transportation means (PMT), the board is retractable and/or foldable (8), offering an additional extension (8'), preferably in the rear; however, it may be added to the front, proving to be extremely practical in its use. This additional space (8') can receive any object, adding a seat, or even another person. The transformation of the towed backup mode to the transport mode showing the mechanical movement of the retractable/foldable board (8), and in this mode, the invention can be used as a vehicle for transportation, with the user getting on the board (8). Observe that the retractable/foldable board (8), when in the horizontal position, serves as a base to support the person who, with feet on the same board, can steer the movements, controlling direction of the personal portable motor-driven transportation means (PMT).

In relation to the versatility in using the retractable/foldable board (8) enabling it to be folded along the side of the backpack (1) and/or on its sides, permitting a bigger board (8) and with the backpack (1) positioned between the user's legs.

The guide pins (9) and (10) that serve for sliding the retractable/foldable board (8), on which they are affixed, move along the mentioned duct (11). On the side of the vertical frame (6) there is the lock (7) that serves to keep the retractable/foldable board (8) in the horizontal position at a 90° angle to the vertical frame (6) when in transport mode. In preferential execution, for the backpack or towed backpack modes (1), on one of the sides of the vertical frame (6) there is a pin with a spring (20) that serves to keep the retractable/foldable board (8) locked while closed in the frame (6). Attached to the front, central part of the vertical frame (6), there is a telescopic handle (2) that is affixed to the two handles (21) and (22).

The insertion of a hand grip (25) in the top of the telescopic handle (2) is a positive aspect that besides serving as support for the hands, also functions as a handle bar, increasing the driveability of the personal portable motor-driven transportation means (PMT). This handle (25) is provided as a single piece up to a quadruple piece, and in the latter case, receiving an extension (26) between them, during assembly. Together with the hand grip (25), there is a control button (27) for activating the personal portable motor-driven transportation means (PMT) as an alternative to the remote control (23).

The highlights of the personal portable motor-driven transportation means (PMT) are thus the driver and rolling wheel assemblies, considering several combinations, with simultaneous or partial operation, able to vary from 4×4, 4×2, 2×1 front or rear, and also with the aid of electric motor activation (15) in traction, motorization is a differential that provides much more comfort, as well as speed in locomotion, and it is also a non-polluting option because it does not use combustion. The electric motor (15) uses, for example, two batteries (18) and (19), preferably 12 V, which are easily rechargeable in any electric outlet, thus permitting a non-polluting option, because it does not use combustion.

Complementing the operation of the personal portable motor-driven transportation means (PMT), observe that the receiver board (17), in turn, receives signals from the remote control (23), which is preferably fed by the 9 V battery (24).

In relation to the personal portable motor-driven transportation means acceleration and braking system, this is done by commands given in the remote control (23), while the steering movements are done by inclining the body on the retractable/foldable board (8), as well as using the hand grip (25) positioned in the telescopic handle (2).

Also present in this patent document, a pedal button (28) for activating the personal portable motor-driven transportation means (PMT), however located on the retractable/foldable board (8), facilitating utilization by the user in accordance with need. Observe that utilization can be concomitant with the control button (27) present on the hand grip, described above, without jeopardizing functions.

In relation to the activation of controls and their devices in the personal portable motor-driven transportation means (PMT), as well as the data obtained on speed, battery charge level, route, GPS, time, etc., they can be informed using wireless technology in contact transmission, increasing the receiver board (17) for these additional processing and logic functions.

Therefore, having described and illustrated the best way to currently contemplate carrying out the patent of invention found in the personal portable motor-driven transportation means (PMT), making it easy to change direction of the equipment, able to go forward or backward, that is, the transport (PMT) can go in any direction.

However, it must be understood that, this invention is not limited to the practical aspects of the currently preferred manner, described and illustrated, and that all such modifications and variations should be considered as being encompassed within the spirit and the scope of this patent for invention.

The invention claimed is:

1. A portable motor-driven backpack-transporting device comprising:
   a framework including a horizontal frame (5), with a vertical frame welded to it at about 90° (6), the vertical frame including a duct (11);
   a backpack, handbag or bag (01) supported on the framework;
   a telescopic handle (2) attached to the vertical frame;
   a retractable/foldable board (8) having an upper surface and a lower surface, at least one wheel being mounted to the lower surface, with guide pins (9) and (10) on opposite lateral sides of the board (8) slidingly and rotatably received within the duct (11);
   at a base of the retractable/foldable board (8) such that the board is adjustable between a horizontal position, wherein the board serves as a base to support a person with feet on the upper surface board, to a storage position wherein the board is generally vertically oriented and contained within the vertical frame with the guide pins (9) and (10) proximate an upper portion of the duct (7);
   at least a second wheel attached to a lower part of the horizontal frame;
   an electric motor (15) connected to at least one of the wheels controlled by a receiver board (17); and
   wherein the retractable/foldable board (8) is configured to be stored within the backpack, handbag or bag (01) when in the storage position.

2. The portable motor-driven backpack-transporting device, in accordance with claim 1, further comprising a remote control (23) configured to transmit a signal to the receiver board (17) for controlling the electric motor (15).

3. The portable motor-driven backpack-transporting device, in accordance with claims 1 or 2, wherein transformation to a transport mode is evidenced by mechanical movement of the board (8), with the user climbing on the board (8); in the horizontal position, it serves as a support base for the person who, with feet on the board, steers the movements of a personal portable motor-driven transportation means (PMT).

4. The portable motor-driven backpack-transporting device in accordance with claims 1 or 2, wherein the retractable/foldable board (8), folded on the side of the backpack and/or on the sides, enabling a bigger retractable/foldable board (8); the backpack can be positioned between the user's legs.

5. The portable motor-driven backpack-transporting device, in accordance with claim 1, wherein a hand grip (25) on a top of the telescopic handle (2), which functions as handle bars, increases the personal Portable motor-driven transportation means (PMT) drivability; the hand grip (25) being provided as a single piece of a quadruple piece, receiving an extension (26) between them.

6. The portable motor-driven backpack-transporting device, in accordance with claim 1, further comprising a control button (27) for activating the personal portable motor-driven transportation means (PMT).

7. The portable motor-driven backpack-transporting device, in accordance with claim 1, further comprising an electric motor activation system (15) using two batteries (18 and 19), which are easily rechargeable in any electric outlet.

8. The portable motor-driven backpack-transporting device, in accordance with claims 1 or 6, further comprising a pedal button (28) for activating the portable motor-driven transportation means (PMT), on the retractable/foldable board (8).

9. The portable motor-driven backpack-transporting device, in accordance with claim 1, wherein activation of the electric motor, as well as data obtained for speed, battery charge level, route, GPS, time, etc., uses wireless technology in transmission of contacts, and including the receiver board (17) for these additional processing and logic functions.

10. The portable motor-driven backpack-transporting device, in accordance with claim 1, wherein the transport (PMT) can go in any direction.

11. The portable motor-driven backpack-transporting device, in accordance with claim 1, wherein when the transport (PMT) is in the storage position the at least one wheel is retracted within the horizontal frame.

12. A portable motor-driven backpack-transporting device comprising:
   a framework including a horizontal frame (5), with a vertical frame welded to it at about 90° (6), the vertical frame including a duct (11);
   a backpack, handbag or bag (01) supported on the framework;
   a telescopic handle (2) attached to the vertical frame;
   a retractable/foldable board (8) having an upper surface and a lower surface, at least one wheel being mounted to the lower surface, with guide pins (9) and (10) on opposite lateral sides of the board (8) slidingly and rotatably received within the duct (11) at a base of the retractable/foldable board (8) such that the board is adjustable between a horizontal position, wherein the board serves as a base to support a person with feet on the upper surface board, to a storage position wherein the board is generally vertically oriented and contained within the vertical frame with the guide pins (9) and (10) proximate an upper portion of the duct (7);

at least a second wheel attached to a lower part of the horizontal frame;

a remote control (23) configured to transmit a signal to a receiver board (17), said receiver board (17) operatively connected to an electric motor;

wherein the electric motor (15) is connected to at least one of the wheels and is controlled by the receiver board (17); and wherein the retractable/foldable board (8) is configured to be stored within the backpack, handbag or bag (01) when in the storage position.

13. The portable motor-driven backpack-transporting device, in accordance with claim 12, wherein the retractable/foldable board (8) further comprises an extension (8') that is extendable toward the rear of the portable motor-driven backpack-transporting device.

14. The portable motor-driven backpack-transporting device, in accordance with claim 12, further comprising a control button (27) for activating the personal portable motor-driven transportation means (PMT).

15. The portable motor-driven backpack-transporting device, in accordance with claim 12, further comprising an electric motor activation system (15) using two batteries (18) and (19), which are easily rechargeable in any electric outlet.

16. The portable motor-driven backpack-transporting device, in accordance with claim 12, further comprising a pedal button (28) for activating the portable motor-driven transportation means (PMT), on the retractable/foldable board (8).

17. The portable motor-driven backpack-transporting device, in accordance with claim 12, wherein activation of the electric motor, as well as data obtained for speed, battery charge level, route, GPS, time, etc., uses wireless technology in transmission of contacts, and including the receiver board (17) for these additional processing and logic functions.

18. The portable motor-driven backpack-transporting device, in accordance with claim 12, wherein the transport (PMT) can go in any direction.

19. The portable motor-driven backpack-transporting device, in accordance with claim 12, wherein when the transport (PMT) is in the storage position the at least one wheel is retracted within the horizontal frame.

20. The portable motor-driven backpack-transporting device, in accordance with claim 12, wherein the retractable/foldable board (8) is configured to be rotated from a generally horizontal orientation to a vertical orientation and the retractable/foldable board (8) is then slid in a generally upward direction within the vertical frame when adjusting the retractable/foldable board (8) between the horizontal position and the storage position.

* * * * *